(12) United States Patent
Landmann

(10) Patent No.: US 7,685,880 B2
(45) Date of Patent: *Mar. 30, 2010

(54) SIGNAL TRANSMISSION SYSTEM

(75) Inventor: Wolf S. Landmann, Fair Lawn, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/228,399

(22) Filed: Aug. 11, 2008

(65) Prior Publication Data

US 2009/0056461 A1 Mar. 5, 2009

Related U.S. Application Data

(63) Continuation of application No. 11/803,128, filed on May 11, 2007, now Pat. No. 7,409,866.

(51) Int. Cl.
*G01L 9/00* (2006.01)
(52) U.S. Cl. ....................................................... 73/717
(58) Field of Classification Search .................... 73/717, 73/754, 700
See application file for complete search history.

(56) References Cited

U.S. PATENT DOCUMENTS

| 4,672,354 | A | 6/1987 | Kurtz et al. |
| 5,955,771 | A | 9/1999 | Kurtz et al. |
| 6,058,781 | A * | 5/2000 | Kusuyama et al. ............ 73/724 |
| 6,065,346 | A * | 5/2000 | Voegele et al. ................ 73/754 |
| 6,363,792 | B1 | 4/2002 | Kurtz et al. |
| 6,530,282 | B1 | 3/2003 | Kurtz et al. |
| 6,787,804 | B1 * | 9/2004 | Yang ............................ 257/62 |
| 6,880,406 | B2 * | 4/2005 | Yang ............................ 73/754 |
| 7,124,639 | B1 | 10/2006 | Kurtz et al. |
| 7,231,828 | B2 | 6/2007 | Kurtz et al. |

* cited by examiner

*Primary Examiner*—Andre J Allen
(74) *Attorney, Agent, or Firm*—Troutman Sanders, LLP; James E. Schutz

(57) ABSTRACT

A single wire interface for a transducer transmits the transducer output as a frequency modulated signal over one single wire during one interval. During a second interval a reference signal is transmitted as a frequency modulated signal. Both the transducer output and the reference signal output are processed by the same circuitry during the respective intervals to provide both frequency modulated signals. The frequencies of the two signals are measured and then the ratio of the two periods which is the reciprocal of the two frequencies is calculated. This ratio is the direct measure of the output of the transducer and when provided eliminates sources of errors.

17 Claims, 4 Drawing Sheets

SIGNAL TRANSMISSION SYSTEM

CROSS-REFERENCE TO RELATED APPLICATION

This application is a continuation of U.S. patent application Ser. No. 11/803,128 filed May 11, 2007, now allowed.

FIELD OF THE INVENTION

This invention relates to a signal transmission system for sensors and more particularly to a signal transmission and measuring system for sensors employing a single transmission wire and a grounded return.

BACKGROUND OF THE INVENTION

As one can ascertain, the prior art is replete with pressure transducers or sensors employed in harsh environments. Such environments include deleterious substances which may destroy the transducer, as well as high pressures and temperatures. High temperatures include those temperatures which are found in various high temperature environments as combustion engines, for example. In other applications, such as the use of pressure transducers in injection molding and for other environments extremely high temperatures are also found. The prior art has disclosed pressure transducers which are capable of operating at very high temperatures as temperatures in excess of 600° C. See for example, U.S. Pat. No. 7,124,639 which issued on Oct. 24, 2006, entitled "Ultra High Temperature Hermetically Protected Wirebonded Piezoresistive Transducer" by A. D. Kurtz et al. and assigned to Kulite Semiconductor Products, Inc., the assignee herein. See also U.S. Pat. No. 6,363,792 entitled "Ultra High Temperature Transducer Structure" issued on Apr. 2, 2002 to A. D. Kurtz et al. and assigned to the assignee herein. See also U.S. Pat. No. 6,530,282 entitled "Ultra High Temperature Transducer Structure" issued on Mar. 11, 2003 to A. D. Kurtz et al. and assigned to Kulite Semiconductor Products, Inc., the assignee herein.

By referring to the above noted patents, one can see applications of such transducers in high temperature environments as well as the monitoring of such signals in such environments. One problem is found when one deals in the oil and geothermal exploration fields. In such oil and geothermal explorations, one uses pressure or temperature transducers which are exposed to temperatures much higher than those experienced by standard electronics. Typical transducers which are used for normal operations are usually limited to temperatures below +125° C. Due to the depth of drilling as well as the use of steam to extract the oil the operating temperature in such explorations exceed 200° C. Pressure transducers using a piezoresistive silicon-on-insulator (SOI) structure are widely used in such applications. Such transducers for example are described in the above noted patents. Also used are platinum resistors (RTD) used to measure the temperature which resistors are also capable of operating at these high temperatures. Thus, the combination afforded in regard to the above is that one requires a pressure transducer which can operate at high temperatures and one also requires electronics which can operate at such temperatures. See for example a co-pending application entitled "High Temperature Pressure Sensing System" Ser. No. 11/234,724 filed on Sep. 23, 2005 for A. D. Kurtz et al. and is assigned to the assignee herein. In that application, there is described a high temperature pressure sensing system which includes a transducer having pressure sensing piezoresistive elements formed by a SOI process. The system also uses SOI CMOS electronic circuitry which is operatively coupled to the piezoresistive sensor as well as ancillary circuitry connected to the unit to provide compensation and normalization. That application is incorporated by reference in its entirety herein.

Other examples of SOI technology may be seen in U.S. Pat. No. 5,955,771 entitled "Sensor for Use in High Vibrational Applications and Methods of Fabricating the Same" issued to A. D. Kurtz and U.S. Pat. No. 4,672,354.

In existing oil and geothermal applications, due to the depth of the drilling as well as due to the use of steam to extract the oil, very high temperatures are involved. In oil and geothermal explorations the wires used in these systems are extremely long and can be as long as 10,000 meters. These wires apart from being extremely long are also expensive. The cost of the wire often exceeds the cost of the transducers. In prior art applications, the pressure transducers are connected to the wiring via a four-to-twenty milliamp electronic interface. The second wire is the metal conduit in which the wire is inserted. The prior art method has significant temperature limitations which are further aggravated by the significant power dissipation of the four-to-twenty milliamp interface. This power dissipation increases the junction temperature of the electronics by several tens of degrees above ambient temperature. The prior art method also requires a separate wire for each pressure or temperature sensor.

The present invention discloses a way of interfacing one or more pressure sensors to a measuring system using only one wire for the signal and power and a return wire which is usually the conduit of the signal/power wire. An electronic interface is advantageous for sensors located in a very high temperature environment at great distances from the measuring system such as described above in the oil and geothermal explorations. The invention is also well suited for integration in a circuit using technology suitable for high temperature operation as the silicon-on-insulator (SOI) process. The signal transmission system or wire interface described is also applicable and advantageous for use in systems operating at more benign temperatures and over shorter distances as it simplifies the wiring as well as the measuring method.

SUMMARY OF THE INVENTION

Apparatus for transmitting a transducer signal to be measured from a signal generation location to a measuring location connected by a single wire where undesirably the transducer signal is subjected to variations caused by multiple sources. The apparatus comprises a transducer positioned at the signal generation location and operative when biased by a power source to provide an output signal according to a monitored condition. A reference level generator is coupled to the power source and operative to provide a reference level output proportional to the value of the power source. A multiplexer for receiving at one multiplex input the transducer output signal and at another input the reference level output to provide at a multiplexer output the transducer signal for a first interval and the reference level for a second interval. A converter responsive to the multiplexer output for converting the transducer signal to a first frequency modulated signal having a frequency output variation according to the value of the transducer output signal during the first interval and for providing a second frequency modulated signal indicative of the reference level during the second interval, where any variations in signals which may be caused by multiple sources are present in both signals; and measuring arrangement positioned at the measuring location and responsive to the modulated signals to provide the ratio of the periods of the signals, where the ratio is a direct measure of the transducer output signal with the undesired variations substantially eliminated.

DETAILED DESCRIPTION OF THE INVENTION

Figure 1:
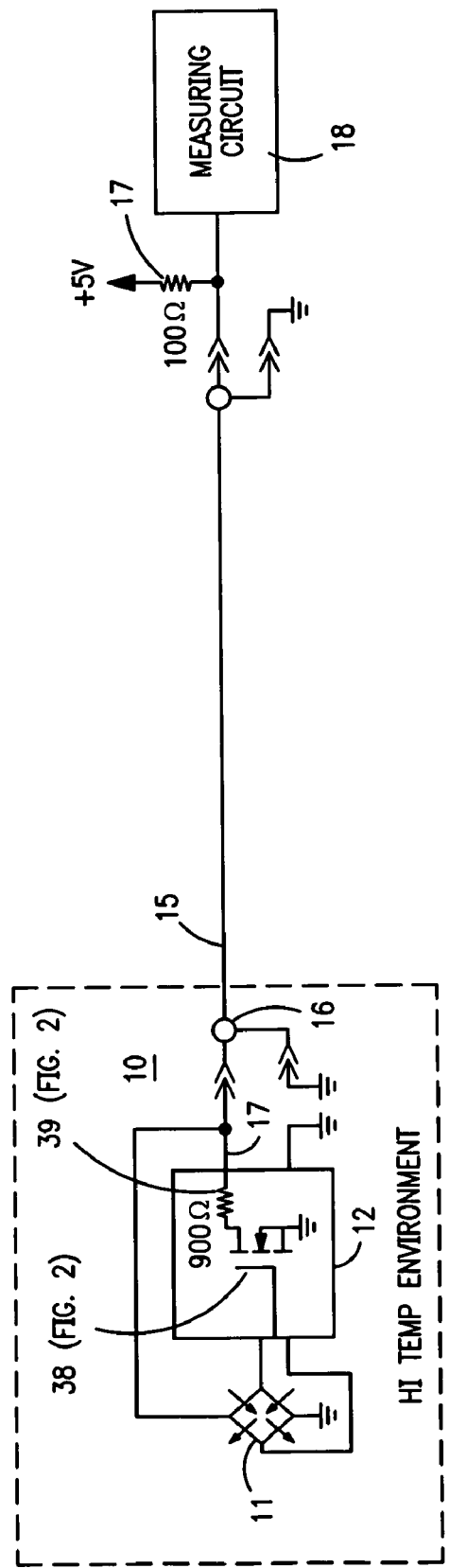
FIG. 1 is a block diagram of a one wire system directed from a signal generation located to a measuring location according to an embodiment of the invention.

Referring to FIG. 1 there is shown a block diagram of a one wire system for measuring a transducer output according to this invention. As part of the signal generation location there is a transducer system 10 which includes a bridge 11 and associated circuitry 12. The bridge 11 is a Wheatstone bridge, which basically is implemented and fabricated by the use of piezoresistive SOI pressure transducers. The bridge 11 and associated circuitry 12 are located at the signal generation location. This location may be the bottom of a drilled shaft for oil exploration or for other purposes. Pressure sensors suitable for use in bridge 11 are well known, for example may be those and are described in the above noted patents and applications. The output of the bridge or pressure transducer can be compensated using its inherent resistance versus temperature characteristics to provide a stable ratio metric output over a wide temperature range. Transducers which operate accordingly are also well known in the art and are described for example also in the above noted patents. Coupled to the output of the transducer is an electronic interface 12. The electronic interface may be fabricated and implemented by SOI electronic circuits including CMOS transistors.

Figure 2:
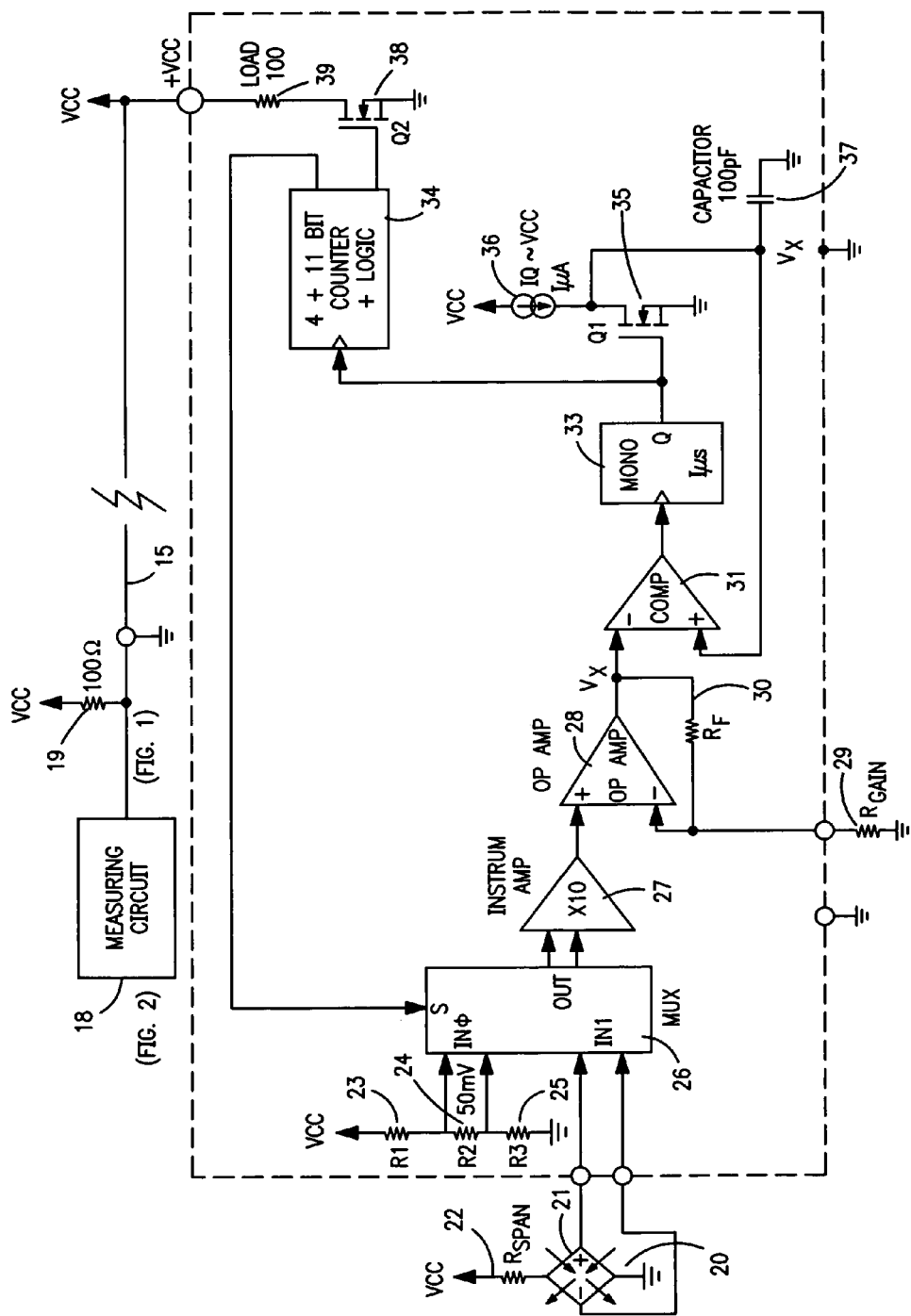
FIG. 2 is a block diagram of the a wire interface located at the signal generation location according to an embodiment of the invention.

The entire unit 10 as shown in FIG. 1 which consists of the bridge 11 as well as electronics 12 may be positioned or inserted into a drilled shaft which would be implemented by techniques as for example used in oil well exploration. This shaft for example may be thousands of meters long. In any event, the entire signal generation apparatus 10 as shown enclosed in the dashed box is positioned near the bottom end of the shaft. The signal generation apparatus has an output 17 which is coupled to a wire 15. The wire 15 runs from the transducer assembly 10 and is coupled to output 17 to a measuring site or location including a measuring circuit 18. The length of the wire 15 may be 10,000 meters or longer. Also shown is a return conduit 16 which may be a shield for wire 15 or may be an actual metal or other conduit used to surround and protect the wire. As seen at the measuring location which is the other end of the shaft and can be a field office or other ground location at normal ambient temperature is the measuring circuit 18. The wire 15 is connected to a voltage source VMS (voltage at measuring source) via a resistor 19. In the exemplary configuration, shown in FIG. 1 VMS is +5 volts while resistor 10 is 100 ohms. The values are by way of example only and other values can be employed. The VMS source supplies operating potential (+Vcc) to the transducer system 10 at the signal generation location. This VMS source is the sole power source used to bias the bridge 11 as well as to operate the circuitry 12. The resistor 19 is DC connected to resistor 39 (FIG. 2) associated with MOSFET 38 (FIG. 2). In FIG. 1 resistor 39 is shown, by way of example to be 900 ohms. Thus, as seen in FIG. 1, the structure 10 which consists of the bridge 11 and the electronics 12 is located in a high temperature environment such as that found at the bottom of a shaft or hole drilled for oil or geothermal exploration and to measure pressure. The output 17 of the system 10 is directed to a single wire 15 which also is associated with a return shield or conduit 16. The wire 15 can be more than 10,000 meters long and is directed to the monitoring or measuring station whereby the output on wire 15 is measured to develop a voltage or an indication at measuring circuit 18 indicative of the pressure or other monitored condition. While the above noted system shown in FIG. 1 depicts the measurement of pressure, it is understood that other measurements can be made such as temperature, etc., utilizing the single wire interface as described.

FIG. 2 shows a block diagram of the one wire interface showing the circuit details utilized to implement the signal generation system 10 of FIG. 1. Essentially before proceeding with a detailed discussion of the interface, a brief description of the operation will be given.

Referring to FIG. 1 the one wire interface transmits the transducer output as a frequency modulated signal at output 17. This frequency modulated signal propagates over wire 15 which also provides the power supply to the sensor and interface. Also transmitted over the wire 15 is a reference signal which reference signal is processed through the same chain as the transducer output signal. The reference signal is also a frequency modulated signal. The two signals are multiplexed in a time division mode, for example one second of the transducer signal followed by one second of the reference signal. The frequencies of the two signals are measured by the ground equipment as measuring circuit 18 and then the ratio of the two periods which are the reciprocals of the two frequencies is calculated. The ratio of the signals is a direct measure of the transducer output, and eliminates all sources of errors. Such errors can be significant, due to the high operating temperatures and are caused by multiple sources, as noise source, RF interference and the like. Therefore, it becomes very difficult to compensate for such sources. As the transducer output and the reference signal are passed through the same chain, and are affected by the same errors, the ratio calculation eliminates all errors. It does not matter how these errors are derived or generated, as they will be present both on the transducer output signal as well as on the reference signal and therefore can be eliminated by the apparatus and methods depicted herein.

As one will understand, the technique and apparatus can be further enhanced such that multiple sensors can be processed through the same chain and the data sent as time multiplexed signals followed by the reference signal. In this way several sensors can be connected to the ground measuring system 18 via a single wire 15. It is also understood that temperature sensors can also be used with this interface. A RTD element can be mounted in a bridge configuration using three fixed metal film resistors and the output of the bridge multiplexed and sent through the same chain as the reference signal. The reference signal should be very consistent and stable with temperature in order to enhance operational effectiveness.

Referring to FIG. 2 the reference signal is derived from the power supply +Vcc by a resistive divider which is located on the SOI chip. This implementation has shown that the ratio of resistors on the chip is very stable and consistent from chip to chip. This ratio is determined by the geometric features of the resistors and stays constant even though the value of the individual resistors may change over temperature and from device to device. Thus the techniques and apparatus described herein, also eliminates the errors due to variations in the supply voltage. Such variations are possible and expected due to the resistance of extremely long wires. As the transducer output and the resistive divider output which is the reference signal are proportional to the supply voltage +Vcc, the ratio calculation eliminates the undesired error as well. As one will understand the electronic interface as for example the circuitry 12 of FIG. 1 is integrated on a SOI chip and the operating temperature of the interface exceeds 250° C., for example. As one can also understand, by referring to the above noted co-pending application entitled "High Temperature Pressure Sensor System" the SOI circuitry depicted therein can be employed herein as well, as for example, FETs, counters, and the like.

Referring to FIG. 2, there is a shown a circuit diagram in block form of the electronic interface 10. As seen the transducer 20 is arranged as a Wheatstone bridge configuration. The Wheatstone bridge includes four piezoresistors such as 21, which are wired in a bridge configuration. The bridge has a ratiometric output which is compensated over the temperature range. As seen the bridge derives its biasing voltage from the voltage source +Vcc which is applied to the bridge via a span resistor 22. Thus the bridge 20 produces a ratio metric output which is compensated over the entire temperature range of operation. Such bridge circuits including those having ratiometric outputs are well known in the prior art and examples of such bridge circuits employing piezoresistors are indicated in the above cited patents. As seen the output of the bridge is applied to the input terminals of input (IN1) of a multiplexer 26. Also shown is a resistive divider consisting of resistors 23, 24 and 25. The resistors 23, 24 and 25 are in series with one terminal of resistor 25 coupled to reference potential or ground and one terminal of resistor 23 coupled to the biasing voltage source +Vcc.

It is noted that the biasing source +Vcc for the resistive divider is the same biasing source employed for the bridge. The junction between resistors 23 and 24 is applied to one input terminal of the multiplexer 26 (INϕ) while the junction between resistors 24 and 25 is applied to the other terminal of the multiplexer input (INϕ). It is also noted before proceeding further that the resistors 23, 24 and 25 are also designated as R1, R2 and R3. The resistors have been so designated as their values are used in the mathematics which are pertinent to the operation of the system. The output of the multiplexer 26 (OUT) is applied to inputs of an instrumentation amplifier 27. The output of the instrumentation amplifier 27 is applied to the non-inverting input (+) of an operational amplifier 28. The operational amplifier 28 has a feedback resistor 30 also designated as RF which is coupled to a gain control resistor 29 indicated as R gain. The feedback resistor 30 is connected and at one terminal to the output of operational amplifier 28 and at the other terminal to the inverting input (−) of the operational amplifier 28. Resistor 29 is coupled between the inverting input (−) of the operational amplifier 28 and reference potential. The total gain of the amplifier arrangement consisting of instrument amplifier 27 and the operational amplifier 28 is set by the resistor 29. It is of course understood that the instrumentation amplifier 27 which is also an operational amplifier has a fixed gain such as a gain of 10 for example. The gain of the operational amplifier is controlled by the value of resistor 29 which is well known.

The output of the amplifier designated as $V_X$ is coupled to the negative terminal of comparator 31. The positive input terminal of the comparator is driven or coupled to a capacitor 37. The capacitor 37 is charged by a current source 36 which is positioned in series with the source electrode of the FET 35, also designated as Q1. As seen the current source 36 is also coupled to the +Vcc supply. The FET 35 also has its source electrode coupled to the positive input of comparator 31 and of course coupled to the non-ground terminal of capacitor 37. The output of the comparator 31 is coupled to the input of a monostable multivibrator 33 whose output is coupled to the gate electrode of the FET 35.

The output of the monostable is also coupled to a 4+11 bit counter and logic circuit 34. The output of the logic circuit 34 is coupled to the selects input (S) of the multiplexer 26. The output of the counter 34 is also coupled to the gate electrode of the FET 38 having a source electrode coupled to a load resistor 39. The resistor 39 is coupled to wire 15 which at the other end has one terminal of resistor 19 coupled at the measuring end. The other terminal of resistor 19 is coupled to the VMS source. The junction between resistor 19 (FIG. 1) and resistor 39 is the +Vcc which is the biasing potential shown in FIG. 2 and used to bias all circuitry as amplifier 27, 28, comparator 31, mono 33, counter 34 and so on.

Operation of the circuit is as follows. The positive input of the comparator 31 as indicated is driven by the capacitor 37. The capacitor 37 is charged by the current source 36 and discharged by the MOSFET transistor 35. The output of the comparator when present triggers the monostable circuit 33 when the capacitor 37 voltage reaches the predetermined value designated as $V_X$. As one can see the output of operational amplifier 28 is $V_X$. When the value of capacitor 37 is charged to $V_X$ the comparator 31 produces an output which triggers monostable circuit 33. The time period of the monostable multivibrator 33 is chosen to be as short as possible but long enough to safely discharge the capacitor 37. In one particular example, a time duration of one microsecond for the output of the monostable 33 is appropriate. The value of the capacitor 37 and of the current source 36 is chosen such that they can be easily implemented on a SOI chip. The prescaler size included in module 34 is chosen such that the output pulses will have a sufficiently low frequency to provide a useful signal after passing through the very high capacitance and resistance of the very long single wire 15 connection to the measuring circuit 18. The output of the monostable 33 as seen is applied to a 15 bit counter 34 (4+11 bits). The counter controls the select pin of the multiplexer 26 and also controls the gate of the switch MOSFET transistor 38. The first four bits of the counter 34 are used as the prescaler and the following 11 bits are used as a counter/sequencer.

The monostable output pulses are first divided by 16 and then the output is applied to the eleven bit sequencer. Thus, as indicated the counter controls the select pin of the multiplexer 26 as well as the gate of the MOSFET transistor 38. When MOSFET transistor 38 is turned on the load resistor 39 is inserted in the circuit increasing the current consumption of the circuit. The increase in the current consumption results in a voltage drop of about one half volt across the 100 ohm resistor shown in FIG. 1 and coupled to the input of the measuring circuit 18. The eleven bit counter 34 controls the select pin of the multiplexer such that for 1024 periods or the first interval of the sequencer the transducer output is processed by the interface through the inputs IN-1 of the multiplexer 26. After this period or interval the reference voltage of 50 millivolts which is derived from the voltage divider consisting of resistors 23, 24 and 25 is processed through inputs INϕ for another pulse period of 1024 pulses of the prescaler.

This is the reference interval. The output of the prescaler drives the gate of the MOSFET transistor 38 generating through the on/off switching of the load resistor 39, the square wave current pulses, which appear as the voltage pulses at the input of the measuring system.

Figure 3A:
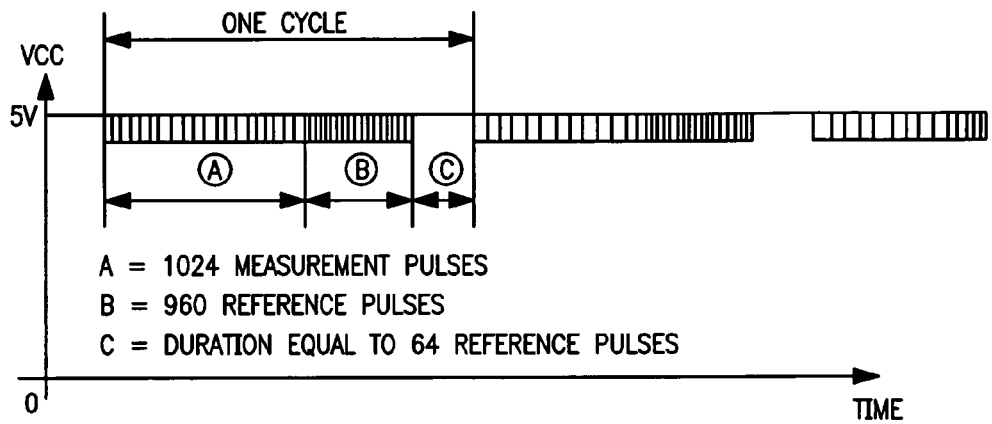
FIG. 3 consists of FIGS. 3A and 3B and depict timing diagrams as showing the pressure and reference intervals according to an embodiment of the invention.
Figure 3B:
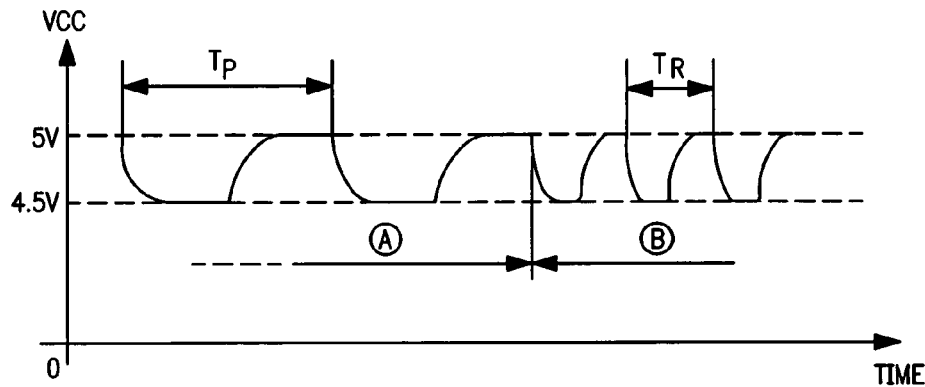

Thus, as seen in FIG. 3A, during the first interval A, 1024 measurement pulses are generated producing a first frequency modulated signal indicative of the value of the transducer output signal. During the next or second interval B, 960 reference pulses are generated producing a second frequency modulated signal indicative of the reference level output. Thereafter, for a third interval C equivalent to a 64 pulse period. Transistor 38 is disabled and no pulses are provided. This 64 pulse interval informs the measuring system that the next sequence of pulses (1024) is the transducer sequence. After counting 1024 pulses the 960 reference pulse interval begins and so on. It is also understood that the 64 pulse period could be positioned between the 1024 interval and the 960 interval and serve the same purpose. These intervals are shown in the timing diagram of FIG. 3A, the 64 pulses are intended for allowing the measuring system to discriminate between the transducer signal phase and the reference signal phase. FIG. 3B is an expanded time scale showing transducer pulses $T_p$ and the frequency variation as well as the reference pulses $T_R$.

Figure 4:
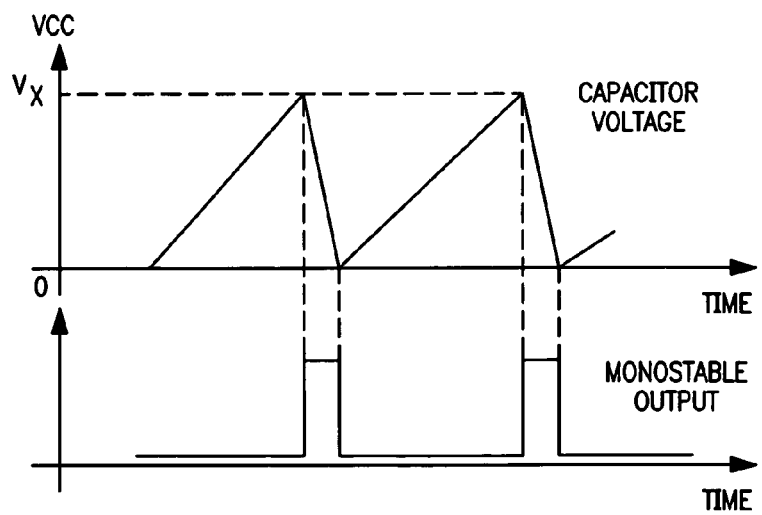
FIG. 4 consists of timing diagrams showing the output of a capacitor and a monostable multivibrator operating according to an embodiment of the invention.

The voltage across capacitor 37 and the monostable output are shown in FIG. 4. Assuming that the capacitor 37 is discharged and a transistor 35 is off, the capacitor 37 is then charged linearly by the current source 36. The capacitor charges until it reaches the voltage $V_X$. At this moment the comparator 31 output changes state triggering the monostable 33 for a short period (e.g., about one microsecond). During this time the capacitor 37 is fully discharged. Afterwards the monostable 33 turns off, the transistor 35 is turned off and the cycle repeats. It is understood that the time scale shown in FIGS. 3 and 4 is distorted for clarity purposes. The duration of the monostable pulses and the discharge time of the capacitor are less than that of a fraction of 1% of the charging time. FIG. 3B shows the pulses as depicted in FIG. 3A expanded in time. The pulse edges are not very fast, and in fact are slowed significantly by the very high capacitance of the long wire. Thus, as seen the pressure pulse designated at $T_P$ has a relatively slow rise time and fall time as does the reference pulses designed as $T_R$. FIG. 3B as indicated shows an expanded version of the pressure transducer pulse values as well as the reference pulse values depicted in FIG. 3A.

Referring again to FIG. 4, there is shown the time diagram of the capacitor 37 voltage in the top diagram and the output of the monostable in the bottom diagram. Thus, as seen when the capacitor voltage reaches $V_X$ the monostable multivibrator triggers for a duration of one microsecond. After the monostable pulse the cycle repeats again as depicted in FIG. 4.

Additional pressure transducers can be employed and for any additional transducer the multiplexer 26 will need an additional set of inputs and the counter/sequencer circuit 34 is implemented to provide additional intervals for the second, third and fourth transducer. As can be seen by referring to FIG. 3A one can implement multiple cycles concerning a cycle A, $A_1$, $A_2$ followed by a reference cycle B. In the exemplary configuration, the value of resistor 19 of 100 ohm at the input of the measuring circuit is arbitrarily chosen. In a preferred embodiment, the value would be equal to the characteristic impedance of the wire and the conduit. In this case, the bandwidth of the signal transmission is significantly higher resulting in a much shorter measurement cycle than shown allowing multiple transducer data to be sent in a shorter time.

Also, the pulses shown in FIGS. 3A and 3B will have much faster transition times resulting in a better accuracy and noise immunity of the period measurement. Another enhancement of the interface can be the addition of a thermal electric cooler for the electronic chip. This chip has a very small size and consequently a very small thermal mass. Thus, a small thermal electric cooler could be positioned on the chip to maintain the chip temperature at safe low levels without significant power consumption. Such thermal electric coolers also designated as PELTIER coolers are well known and are employed in many electronic chips such as microprocessors for use in computers and this will not be described in further detail.

In order to more clearly understand the nature of the invention the following circuit analysis is hereby presented.

Referring again to FIG. 2, in conjunction with FIGS. 3 and 4, assuming the sensor is a piezoresistive bridge 20 compensated using traditional ways, the bridge output voltage $V_{BR}$ can be written as:

$$V_{BR} = k*p*V_{CC}$$

where k is the bridge sensitivity, p is the pressure, and $V_{CC}$ is the bridge supply voltage. During the measuring phase, i.e. when IN1 of the mulitplexer 26 is selected, the output of the amplifier 28 $V_X$ can be expressed as;

$$V_X = G*V_{BR}$$

where G is the amplifier gain.
The voltage $u_c$ across the capacitor 37 is:

$$u_c = \frac{I_Q^* t}{C}$$

where $I_Q$ is the capacitor charging current, t is the time and C is the capacitance 37. $I_Q$ is generated by the current source 36. When $u_c$ reaches the level $V_X$ then the comparator 31 changes state, thus triggering the monostable circuit 33 which rapidly discharges the capacitor 37 through the transistor 35 (Q1). Neglecting the very short discharge time, the cycle time T of the capacitor 37 (C) can be calculated by substituting $V_X$ instead of $u_c$, resulting:

$$T = \frac{C*V_X}{I_Q}.$$

Taking into account the prescaler 34 factor of 16, the period $T_P$ of the output signal during the measuring phase is:

$$T_P = \frac{16*C*V_X}{I_Q}.$$

By substituting the formulas for $V_X$ and $V_{BR}$ the period $T_P$ becomes:

$$T_P = \frac{16*C*G*k*p*V_{CC}}{I_Q} = k*p*\frac{16*C*G*V_{CC}}{I_Q}.$$

Considering now the second phase, when the reference voltage $V_R$ is selected by the multiplexer 26 we have:

$$V_R = \frac{R2}{R1+R2+R3} * V_{CC} = r * V_{CC}.$$

The factor r is the resistance ratio:

$$r = \frac{R2}{R1+R2+R3}.$$

A similar calculation for the period $T_R$ during this reference phase results:

$$T_R = r * \frac{16 * C * G * V_{CC}}{I_Q}.$$

At this point, it is important to note that the capacitance C 37, the gain G, the supply voltage $V_{CC}$ and the charging current $I_Q$ all have large random shifts with temperature and variations from device to device, while the factor r is very constant over temperature and from device to device. Calculating the ratio between $T_P$ and $T_R$ results:

$$\frac{T_P}{T_R} = \frac{k}{r} * p.$$

This allows one to calculate the pressure p as:

$$p = \frac{r}{k} * \frac{T_P}{T_R}.$$

This formula shows that the pressure p can be calculated from two time measurements of $T_P$ and $T_R$ and from two very stable and well defined constants k and r.

For the component values shown on the schematic:
$I_Q$=1 µA
C=10 pF
$V_X$=1V to 4V during the measuring phase
$V_X$=2.5V during the reference phase resulting in the charging times of the capacitor to be 100 µs to 400 µs during the measuring phase and 250 µs during the reference phase.

Due to the 4 bit prescaler, i.e. divide by 16, the respective periods in the transmitted waveform are 16 times longer, i.e. $T_P$=1.6 ms to 6.4 ms during the measurement phase, and $T_R$=3.2 ms nominal during the reference phase. The duration of the flat portion of the waveform is 64 periods of the reference pulses, corresponding to 204.8 ms.

It is important to note that the same calculations can be done for other measurements other than the pressure p. To measure the temperature, a bridge with three fixed resistors and an RTD as the fourth arm can be used.

As one can understand the interface as described above has extreme advantages over the prior art. One main advantage is that there is a reduced number wires for multiple transducers resulting in greater cost savings, less complexity, and improved reliability. The electronic circuit is implemented in a single integrated chip as all the components shown in the above diagram of FIG. 2 are known building blocks of SOI processing techniques. Many of the components as seen in the block diagram exhibit large changes with temperature when processing a single signal. These errors are cancelled when the ratio of the two periods is calculated. Such errors result, for example, from mismatch of gain resistors, changes in the value of the capacitor (e.g., capacitor 37) changes in the value of the current source 36, and changes in other circuit components from device to device as well as the effective resistance of the long wire and the value of the supply voltage.

As indicated, the circuit can be implemented as a very small integrated circuit chip with very few external connections. For a single transducer, the chip requires only five pins, allowing use of a very small package. The functions of the external measuring circuit are simpler than other implementations as the measuring circuit has to measure only two time periods which can be done with a comparator and digital circuits with a much better accuracy and much less complexity than any other measurement. The circuit can operate from a five volt supply reducing the power dissipation compared with other circuits requiring much higher voltages. There is no need for voltage regulators or stable references as all of the pertinent features due to changes and so on are cancelled by performing a ratiometric indication.

It is well known based on the above, as to how the ratiometric calculation can be performed as there are many circuits well known in the art which are capable of providing division of, for example $T_P$ divided by $T_R$ as well as multiplication. All of this can be implemented by a microprocessor or conventional circuits which are widely available. As discussed herein, the ratiometric measurement according to an aspect of the present invention cancels out substantially all variations.

Figure 5:
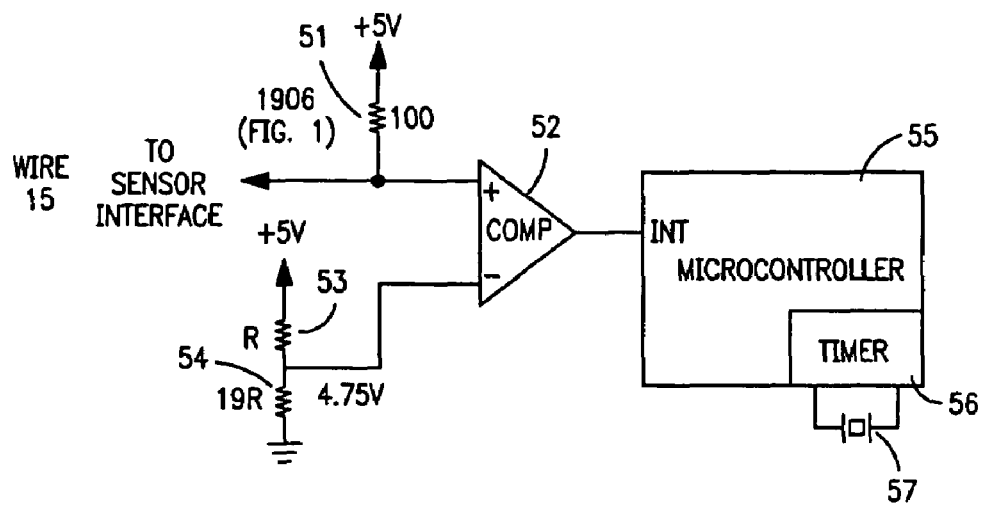
FIG. 5 is a block diagram of a signal measuring arrangement according to an embodiment of the invention.

Referring to FIG. 5 there is shown a comparator 52, the positive input or non-inverting comparator 52 is directed to resistor 51 where one terminal of resistor 51 connected to the +5 volt supply which is equivalent to the VSM supply depicted in FIG. 1. Resistor 51 is equivalent to resistor 19 shown in FIG. 1. The positive input of comparator 52 is directed to wire 15 and hence to the output of the sensor interface as depicted in FIG. 2. The inverting input of comparator 52 is biased by connecting it to the common terminal of the voltage divider consisting of resistors 53 and 54. The voltage divider consisting of resistors 53 and 54 supplies a voltage of 4.75 or 0.25 volts below the supply voltage. This level corresponds to the middle of the pulses generated by the sensor interface. The pulses generated by the sensor interface, are shown in FIG. 3B.

The output of the comparator is connected to an input of a microcontroller or microprocessor 55 which includes a timer 56 controlled by a crystal 57. The measuring system as indicated is located remotely from the sensor interface and as depicted in FIG. 1 is represented as measurement system 18. The measuring system is at the surface of the ground if the interface 10 is placed in a drilled aperture or a drilled well associated with an oil well, for example. In any event, the measuring circuit is at a normal temperature such as room temperature or ambient temperature. The measuring system determines the two periods in the pulses present in one complete cycle and then calculates the ratio of these periods. This measurement can be done in many ways, using typical time and frequency measurements. Two such implementations are depicted in the figures and are based on identifying the start and end of the cycle from the flat portion (for example no pulses, corresponding in duration to the 64 pulse duration) of the waveform. This is shown in FIG. 3A. The 64 reference level contains no pulses while the period indicative of the pressure transducer output contains 1024 measurement pulses, while the duration of the reference signal is 960 reference pulses. As indicated above, the period of the flat portion of the waveform is 204.8 milliseconds this is much longer than the periods of the measurement pulses which can vary between 1.6 milliseconds to 6.4 milliseconds or the reference pulses approximately at a period of 3.2 milliseconds.

Still referring to FIG. 5, the signal from the interface which is the signal shown in FIG. 3 is applied to the positive input of the comparator 52, while the negative input of the comparator is biased below the supply voltage at a level corresponding to the middle of the pulses generated by the sensor interface. This can be shown in FIG. 3B. The output of the comparator is applied to the interrupt input (INT) of a microcontroller or a microprocessor 55. The microcontroller 55 time stamps each interrupt by reading the internal timer 56 as well as the microcontroller counts these interrupts. By calculating the difference between the two successive interrupts, the microcontroller 55 identifies first the flat portion of the waveform, as its duration is much longer than any pulse in the sequence. After the flat portion is identified, the microcontroller 55 counts 1024 pulses, determines their total duration and divides the result by 1024, thus determining the period of the pulse as corresponding to the sensor data. Immediately after these 1024 pulses, the microcontroller counts the next 960 pulses. It then determines their total duration and divides the result by 960 thus determining the period of the reference pulses.

The ratio of the two periods is then calculated to determine the value of the quantity to be measured. This, for example, may be pressure in the case of utilizing a pressure transducer or may be temperature in the case of using a temperature transducer. Either the pressure or the temperature transducer is arranged in a bridge circuit, as shown, for example in FIG. 1. Therefore, one can utilize this technique to measure pressure, temperature or any other value which can be implemented as a voltage at the output of a bridge configuration.

Figure 6:
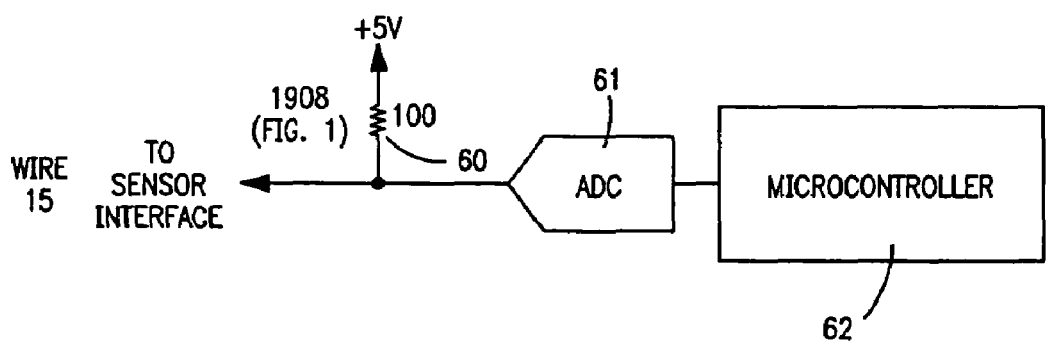
FIG. 6 is an alternate embodiment of a signal measuring system according to an embodiment of the invention.

Referring to FIG. 6 there is shown another exemplary method of measuring the output of the sensor interface. Also seen in FIG. 6 there is a resistor 60 which is also equivalent to resistor 19 of FIG. 1. The resistor 60 has one terminal coupled to the input of analog-to-digital converter 61 and the other terminal coupled to the +5 volt supply. The input of the analog-to-digital converter 61 is connected to wire 15 and thus connected to the sensor interface. The output of the analog-to-digital converter 61 is connected to the input of a microcontroller 62. The analog-to-digital converter 61 digitizes the incoming waveform. The sampling rate of the analog-to-digital converter is configured to be about 10 times that of the fastest pulses in the sequence resulting in a sampling interval of 160 microseconds. The flat portion of the waveform is easily identified as no major transitions occur through relatively long duration of 204.8 milliseconds.

Next the period of a complete cycle is determined as the time between two successive flat portions. The waveform is then digitized for one complete cycle and the result stored. The computer then generates data for a theoretical waveform, with the same structure as the real one. Thus, for example, the computer generates 1024 measurement pulses, 960 reference pulses and a flat portion corresponding to 64 reference pulses. The periods of the measurement and the reference pulses are arbitrarily chosen. The cross correlation function of the two waveforms is then calculated while the two periods in the theoretical waveform are varied until the cross correlation function shows a very short maximum value as a peak. The respective period values in the theoretical waveform corresponding to this peak represent the actual measurement and the reference period. Thus, the reference period again is used to produce the ratio between the pressure level period and the reference period to produce an output indicative of pressure, while undesired variations are thereby cancelled.

The programming regarding the microcontroller shown in FIG. 5 and FIG. 6 may be understood by one skilled in the art as the steps for producing and implementing the measuring system are clearly described. It is understood that there are other techniques which can be employed to measure the time period of both the frequency modulated pressure transducer output and the frequency modulated reference signal level output.

It should be understood by one skilled in the art that there are many alterations, and variations of the above noted circuitry all of which are deemed to be encompassed in the spirit and scope of the claims appended hereto.

What is claimed is:

1. Apparatus for transmitting a transducer signal to be measured from a signal generation location to a measuring location connected by a single wire where said transducer signal is subjected to undesired variations caused by multiple sources, comprising:
   a transducer positioned at said signal generation location and operative when biased by a power source to provide an output signal according to a monitored condition,
   a reference level generator coupled to said power source and operative to provide a reference level output proportional to the value of said power source,
   means for converting said transducer signal to a first frequency modulated signal having a frequency output variation according to the value of said transducer output signal during a first interval and for providing a second frequency modulated signal indicative of said reference level during a second interval, wherein variations in signals which may be caused by multiple sources are present in both signals, and
   a measuring circuit positioned at said measuring location and responsive to said modulated signals to provide the ratio of the periods of said signals with said variations substantially eliminated.

2. The apparatus according to claim 1 wherein said means include a multiplexer for receiving at one multiplexer input said transducer output signal and at another input said reference level output to provide at a multiplexer output said transducer signal for a first in level and said reference level for a second interval, and
   a converter responsive to said multiplexer output for said transducer signal for converter, said transducer signal to a first frequency modulated signal having a frequency output variation according to the valve of said transducer output during said first interval and for providing a second frequency modulated signal indicative of said reference level during a second interval.

3. Apparatus for transmitting a transducer signal to be measured from a signal generation location to a measuring location connected by a single wire where the transducer signal is subjected to undesired variations caused by multiple source, comprising:
   a reference level generator located at said signal generation level and for providing an output signal subjected to said undesired variation;
   means for converting said transducer signal and said reference output signal to a first and second modulated signal where said undesired variations are present in both signals and;
   a measuring circuit positioned at said measuring location and responsive to said modulated signals to provide the ratio of the periods of said signals where said ratio is a direct measure of said transducer output signal with said undesired variations substantially eliminated.

4. The apparatus according to claim 3 wherein said first and second modulated signals are frequency modulated signals.

5. The apparatus according to claim 3 wherein said transducer is a pressure transducer.

6. The apparatus according to claim 5 wherein said pressure transducer incorporates piezoresistive sensors.

7. A method for transmitting a transducer signal to be measured from a signal generation location to a measuring location connected by a single wire, said transducer signal subjected to variations caused by multiple sources, comprising the steps of:
placing a transducer at said signal generation location,
placing a reference signal generator in close proximity to said transducer,
converting said transducer output to a first modulated signal,
converting said reference signal output to a second modulated signal,
transmitting said first signal along said wire for a first given interval,
transmitting said second signal along said wire for a second interval different than said first,
measuring said first and second signals at said measuring location to provide the ratio of the periods of said signals which ration is indicative of the transducer output relatively free of all variations caused by said multiple sources.

8. The method according to claim 7, further comprising the steps of:
multiplexing said first and second signals, and
Controlling said multiplexing to transmit said first signal for said first interval and said second signal for said second interval.

9. The method according to claim 7, wherein the step of placing a transducer includes placing a pressure transducer at said signal generation location.

10. The method according to claim 7, where said first and second modulated signals are frequency modulated signals.

11. The method according to claim 7, further comprising transmitting a transition signal along said wire after said first interval and said second intervals to indicate a transition.

12. The method according to claim 9, wherein said signal generation location is the bottom end of a drilled oil well shaft and where said measuring location is at the top end of said shaft.

13. The method according to claim 12, wherein said pressure transducer is a piezoresistive transducer having piezoresistor sensors arranged in a Wheatstone bridge array.

14. The method according to claim 7, wherein the step of placing a transducer includes placing a temperature transducer.

15. Apparatus for transmitting a pressure transducer signal to be measured from a signal generation location located at one end near the bottom of a drilled oil well shaft extending to a depth of over 1000 meters and associated with temperatures of over 150° C., said shaft extending to the surface where a measuring location is located and where said signal generation location and said measuring location are connected by a single wire, said transducer signal undesirably subjected to variations caused by multiple sources, comprising:
a pressure transducer positioned at said one end of said shaft, and operative to provide an output signal when biased by a power source according to the value of pressure at said one end,
a reference level generator located in close proximity to said pressure transducer and operative to provide a reference signal level, said reference level generator coupled to said power source to provide a reference signal proportional to said value of said power source,
switching means coupled to said pressure transducer and said reference level generator to enable said pressure transducer output to be transmitted at an output for a first interval and to enable said reference signal to be transmitted for a second interval at said output,
converting means coupled to said switching means output for converting said pressure transducer output to a first frequency modulated signal and to convert said reference signal to a second frequency modulated signal where said undesirable variations are present in both frequency modulated signals, and
measuring means positioned at said measuring location and responsive to said first and second frequency modulated signals to provide the ration of the periods of said signals where said ration is a direct measure of said pressure transducer signal with all said variations substantially eliminated reference signal output.

16. The apparatus according to claim 15, wherein said pressure transducer, said reference level generator, said switching means and said converting means are all positioned on the same substrate.

17. The apparatus according to claim 16, wherein said substrate is an SOI substrate.

* * * * *